T. DUNN.
PNEUMATIC TIRE TREAD.
APPLICATION FILED MAR. 26, 1918.

1,315,292.

Patented Sept. 9, 1919.
2 SHEETS—SHEET 1.

INVENTOR
T. Dunn.
BY H. R. Kerslake
ATTORNEY

T. DUNN.
PNEUMATIC TIRE TREAD.
APPLICATION FILED MAR. 26, 1918.

1,315,292.

Patented Sept. 9, 1919.
2 SHEETS—SHEET 2.

INVENTOR
T. Dunn.
BY H. R. Kerslake
ATTORNEY

UNITED STATES PATENT OFFICE.

THOMAS DUNN, OF LONDON, ENGLAND.

PNEUMATIC-TIRE TREAD.

1,315,292.  Specification of Letters Patent.  Patented Sept. 9, 1919.

Application filed March 26, 1918. Serial No. 224,848.

*To all whom it may concern:*

Be it known that I, THOMAS DUNN, a subject of the King of Great Britain and Ireland, and residing at 73 Thornton avenue, Streatham Hill, London, S. W. 2, England, have invented certain new and useful Improvements in Pneumatic - Tire Treads, of which the following is a specification.

When the problem of the construction of pneumatic tires and the questions connected with their efficiency in use are considered, with due regard to the real nature of the particular functions they have to fulfil, it soon becomes obvious that, of all the strains to which these tires are subject in use on motor vehicles, undoubtedly the most severe strains are those imposed upon the tires of driving wheels by the action of the engine or the application of the brake, these strains being directly circumferential in their direction. With this observation, it is evident that there is no point more important in tire construction than that they be specially constructed and fitted to withstand circumferential strains. It is well known that if the clutch is put in or the gear changed too suddenly, or if a car is frequently pulled up too sharply on the brake, the tires on the back wheels will soon be torn to pieces. Not only may the running surface be thus rapidly stripped bare, but strains are thus imposed on the fabric, which renders the same liable to puncture. Notwithstanding this, however, tires are at present commonly made without any special means being provided to take care of these circumferential strains. Yet it is obvious that, if a circumferentially inextensible but light and flexible band is embedded in or applied to the tread of the tire, the band being made flat transversely and shorter than the normal circumference of the inflated tire, said band will materially compress the tire radially all around. The band will thus be kept under permanent high tension by the tire air pressure and such a band will distribute circumferential strains uniformly around the whole tire, so that no particular part will have to bear a greater share of them than any other part. Thus the effect of the strains on the fabric will become quite negligible, while provision can at the same time be made, as by fitting the band with detachable and renewable blocks as hereinafter described, for the ready repair of local injury to the running surface of the tire. The advantages secured by the adoption of these features of construction in motor car tires have been conclusively demonstrated in the case of tires of a special construction embodying these features. Such constructions are described in the specifications of former British patents granted to me,— *i. e.*, No. 14403 of 1913 and No. 109455 of 1917. The present invention has for its object to secure these advantages in combination with tires constructed to include the new features or in use with tires of ordinary construction. Tires constructed to include the improvements or ordinary tires provided with the improvements have greatly increased efficiency and their mileage cost is greatly reduced.

These tread bands have a transversely flat circumferentially inextensible band of high flexibility and great strength embedded in their base, and are adapted to be detachably fitted around an ordinary tire casing, and preferably have their outer surface provided with continuous series of blocks of rubber of ample depth.

Referring to the accompanying drawings which illustrate the device applied to a motor car tire:—

Figure 1:
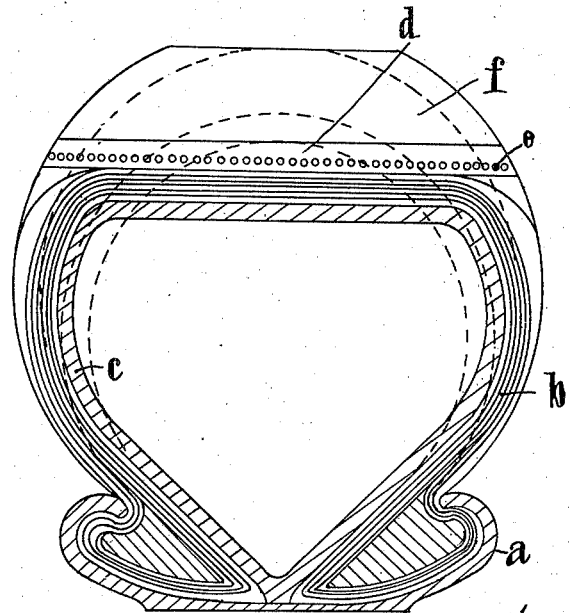
Figure 1 shows a transverse section of a tread fitted on an ordinary tire casing.

In the drawings *a* is the rim on which the tire is mounted, *b* is the tire casing, and *c* the air tube.

Figure 3:
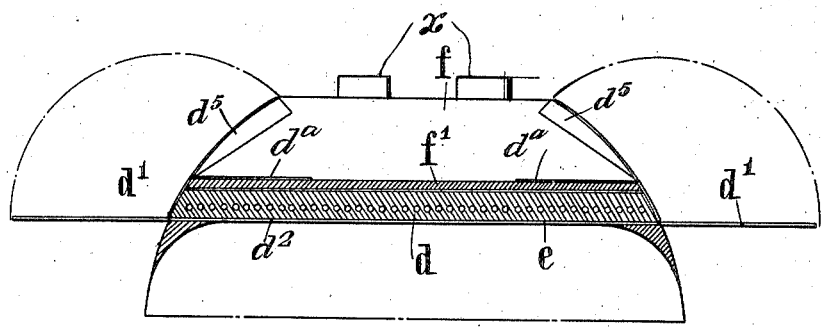
Figs. 3 and 4 show sectional and plan views of the tread band and blocks and illustrate the manner of securing the blocks to the band.
Figure 4:
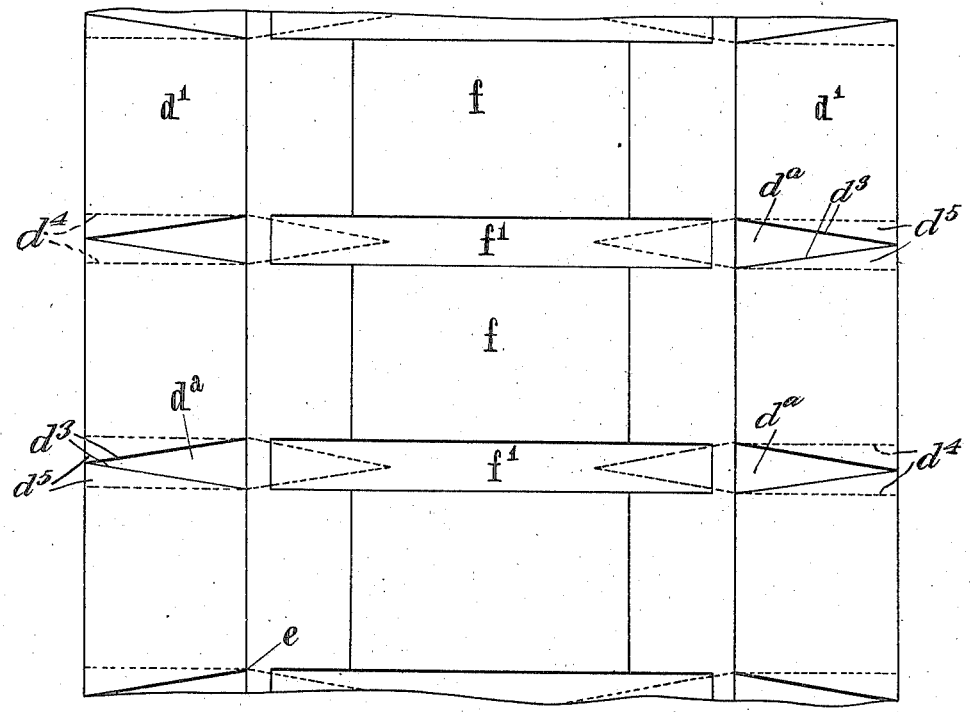

*d* is a tread band adapted to be attached to the ordinary casing. In Fig. 1, the dotted lines show in outline a transverse section of an ordinary casing while the full lines show a casing of corresponding size with the band as an attachment. It will be seen that the casing is flattened beneath the band by its circumferential constricting action and that there is no rubber beneath the tread band except at the sides, and further that the outside circumference of the tire is the same as it was originally. The band $d$ is provided with a circumferentially inextensible, transversely flat, highly flexible band of stranded wire $e$, which is embedded in the band $d$. The tread band $d$ as shown is provided with circumferentially spaced blocks $f$, which form the bearing surfaces for the tire. These blocks may be made integral with the band $d$ or they may be attached to the same. A means of attachment is shown in Figs. 3 and 4, in which a band of rubber coated wire netting $d^2$ is placed between the tread band $d$ and this band $d^2$ has its lateral edges cut inwardly on diagonal lines $d^3$, as shown in Fig. 4. The transverse edges of these cut portions are then bent over on the dotted lines $d^4$ and the tongues $d^1$ and $d^a$ are formed between the cuts. Rubber strips $f^1$ are arranged transversely of the tread band between the blocks $f$ and the tongues $d^a$ are bent over upon these strips. The tongues $d^1$ are bent over, as shown in Fig. 4, into engagement with the lateral edges of the blocks $f$ for the purpose of securing the blocks to the tread band while the bent edges $d^5$ of the tongues $d^1$ engage the sides of the blocks as shown in Fig. 3.

Figure 5:
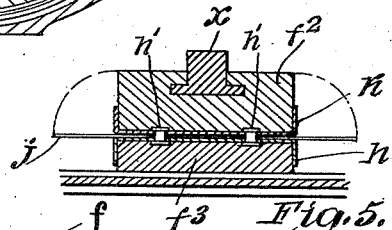
Figs. 5 and 6 show longitudinal and transverse sectional views of a detachable block fitted over a fixed block of reduced thickness.
Figure 2:
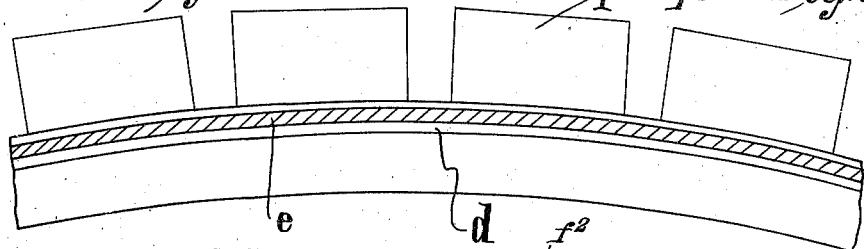
Fig. 2 is a longitudinal section of a portion of such tread band showing rubber blocks fitted thereon.
Figure 6:
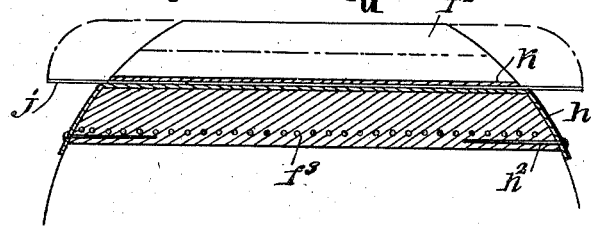

In Figs. 5 and 6, $h$ is a base plate of a detachable block $f^2$, adapted to be fitted over a fixed block of reduced thickness $f^3$, and $j$ is a piece of rubber coated wire gauze, the edges of which are cut and folded up and made to adhere to the sides of the block $f^2$. $k$ is an upper U-shaped plate in the base of the block $f^2$ and this plate is secured to the plate $h$ by means of rivets $h'$. The piece of wire netting $j$ is secured between the plates $h$ and $k$ and its edges are bent up to engage the sides of said block $f^2$. It will be understood that these blocks extend in spaced relation around the entire tread band.

The band $e$, which is practically unpuncturable, is of such breadth that it provides a complete protection for the tire casing, and the blocks on the tread band are of sufficient depth to take the road wear.

In mounting the tread band on a used or worn casing, the exterior rubber, the outside layer of canvas and in some cases more than one layer of canvas is stripped off the casing before the tread band is applied. In this case the effect in appearance is, of course, that of a new tire, while the practical result is the production of a tire of much greater efficiency than those of ordinary construction.

The blocks are designed to raise the vulnerable parts of the tire so far clear of the road surface and of all ordinary obstacles upon it that, apart from the direct protection provided by the tread band, the risk of puncture or other such injury is rendered quite negligible.

When the rubber blocks shown in Fig. 3 are worn down they may be re-faced with rubber, cold cured or vulcanized on, in the latter case preferably by some process by which the necessary heat is applied locally from the outside, so that it will not injure the rest of the rubber of the bands. By this means the blocks may be re-faced an indefinite number of times at very small cost, whereby the maintenance cost of tires may be kept very low.

As shown in Figs. 5 and 6, the detachable blocks $f^2$ are made thinner than those of Figs. 3 and 4 and are adapted to fit on the top of the worn down blocks $f^3$, which should be uniformly reduced to the desired thickness for the purpose. These detachable blocks are formed on thin steel plates $h$, and the front and rear edges of these plates are folded inward at right angles to fit down the sides of the fixed blocks, while the lateral edges of said plates have lugs adapted to fit down the sides of the tread band to below the level of the stranded wire band $e$. These detachable blocks are secured in place by pins $h^2$ driven through holes in the lugs and into the tread band beneath the stranded wire band $e$. The rubber portions of these detachable blocks are secured on their steel attachment plates by first laying on these plates pieces of rubber coated wire gauze $j$, then placing over this wire gauze other thin steel plates $k$, which may have their edges turned outward to increase their stiffness. The plates $h$ and $k$ are secured together by the rivets $h^1$ and the wire gauze pieces $j$ are secured between said plates. Then the rubber blocks are put in place on the outer plates, the wire gauze is folded up the sides of the blocks $f^2$, and the complete blocks are then vulcanized by suitable methods.

It will be understood that these detachable tread bands, by virtue of their inextensibility circumferentially, will distribute all circumferential strains equally around the whole tire and also distribute lateral strains very widely. The tread band will also relieve the casing of a large share of the strain of the air pressure. With these tread bands, the air pressure in the tire may be of less degree of weight supporting efficiency than before, and may be only 50 lbs. per square inch, this considerable reduction of necessary air pressure being in itself obviously a most important further advantage secured by the use of the tread bands. So much less strength is required in covers when fitted with these tread bands that if it is desired to use very thick covers on light cars, it is sometimes advisable to strip one or two layers of canvas from the inside of the covers to increase their flexibility, and thus secure not only much easier running but also increased mileage, since so long as a cover is strong enough for its work, the more flexible it is, the better it wears; particularly when, as it is with these tread bands, it is duly protected both from severe local strains and from road wear and injury.

It should here be noted further that because these tread bands render the treads transversely flat (as clearly the tread of a tire ought always to be) the flat form will stop all the continuous acute transverse flexion in the tread. In ordinary tire casings the usual round-treaded form occurs chiefly in that part where the tire is necessarily thickest and strongest, so that flexion there, especially when acute, is most destructive, being the chief cause of the serious heating which commonly occurs with the tires at high speeds. The rounded form of the ordinary casing tread also causes wastage of propulsive power, much more indeed than is hardly ever realized. With the tread bands, the longitudinal flexion which takes place in the tread itself occurs only between the blocks when they are used, so that this flexion between the blocks is perfectly harmless. The tread bands thus secure all the benefits of a very thick, practically invulnerable and easily repairable tread, with the practically complete protection it affords both from severe local strains and from road wear and injuries. These benefits are secured not only without any sacrifice of ease of running but on the contrary the resiliency of a tire provided with the tread is increased. Because also of the great lateral stability given to the tires by the circumferentially inextensible band in the tread the tread bands are, notwithstanding the reduced air pressure required when they are used, highly efficient as non-skids even with plain rubber blocks. If desired the blocks may also be made fitted with ordinary non-skid studs X, as shown in Figs. 3 and 5.

Having now described my invention, what I claim as new and desire to secure by Letters Patent is:—

1. Detachable tread bands for attachment to pneumatic tires comprising a circumferentially inextensible flexible band having wire insertions therein, made flat transversely and of such length that they constrict circumferentially the outer surface of tires around which they are applied, combined with renewable rubber tread blocks.

2. Detachable tread bands for attachment to pneumatic tires comprising a circumferentially inextensible flexible band made flat transversely and of such length that they constrict circumferentially the outer surface of tires around which they are applied, combined with wire gauze bands treated with rubber placed beneath the circumferentially inextensible bands and their edges adhesively applied to the ends and partly to the sides of rubber tread blocks substantially as described.

3. Detachable tread bands for attachment to pneumatic tires comprising a circumferentially inextensible flexible band and having wire insertions therein made flat transversely and of such length that they constrict circumferentially the outer surface of tires around which they are applied, with permanently fixed rubber tread blocks of reduced thickness secured thereto provided with divided H-shaped caps between the parts of which pieces of wire gauze treated with rubber are inserted and their edges adhesively applied to rubber tread blocks placed in the open side of said caps, whereby the said blocks are secured therein substantially as described.

4. Detachable tread bands for attachment to pneumatic tires comprising a circumferentially inextensible flexible band and having wire insertions therein made flat transversely and of such length that they constrict circumferentially the outer surface of tires around which they are applied, having flat inner surfaces substantially as described.

In testimony whereof I have signed my name to this specification.

THOMAS DUNN.